H. B. LAYMAN.
CONNECTING ROD.
APPLICATION FILED APR. 17, 1916.

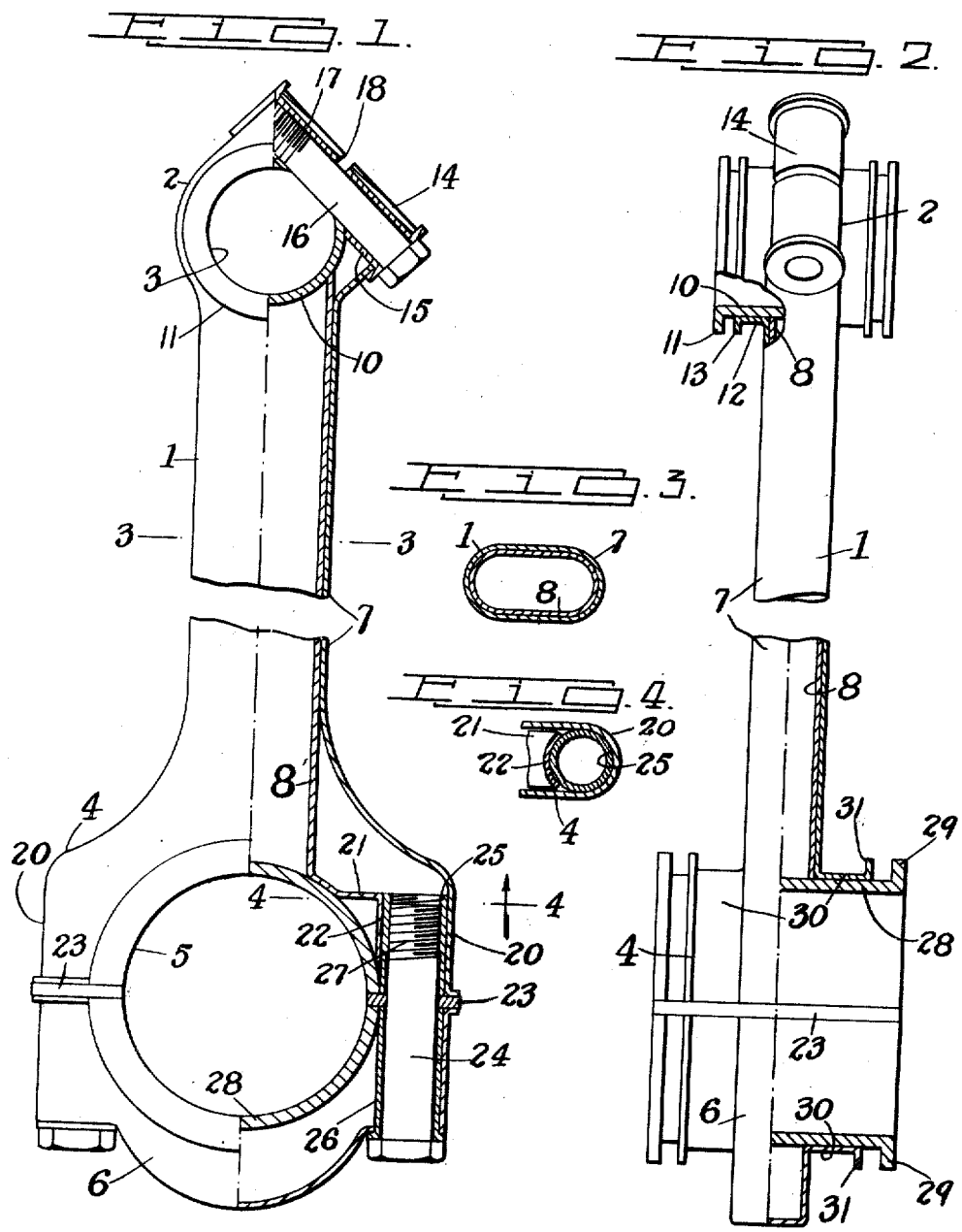

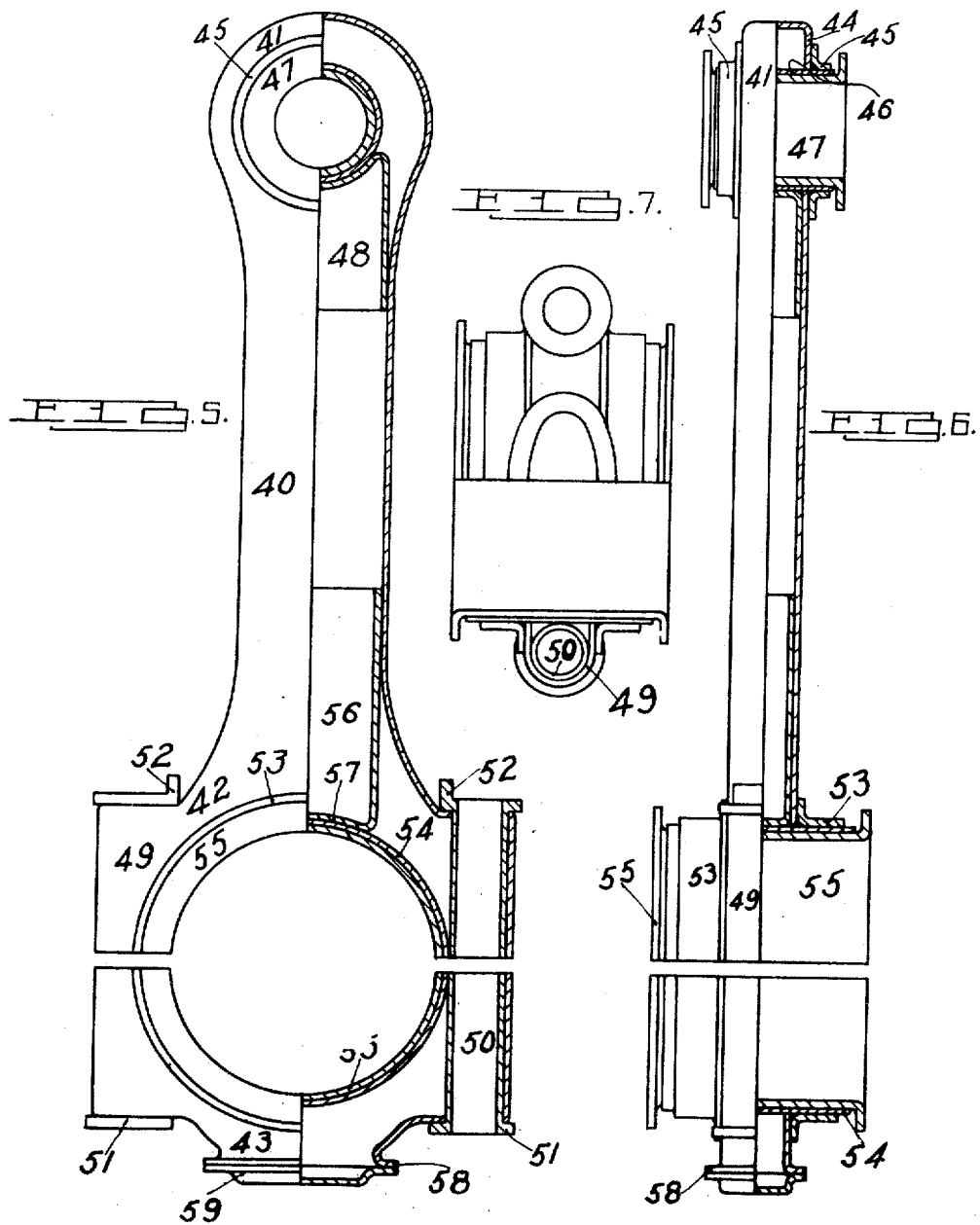

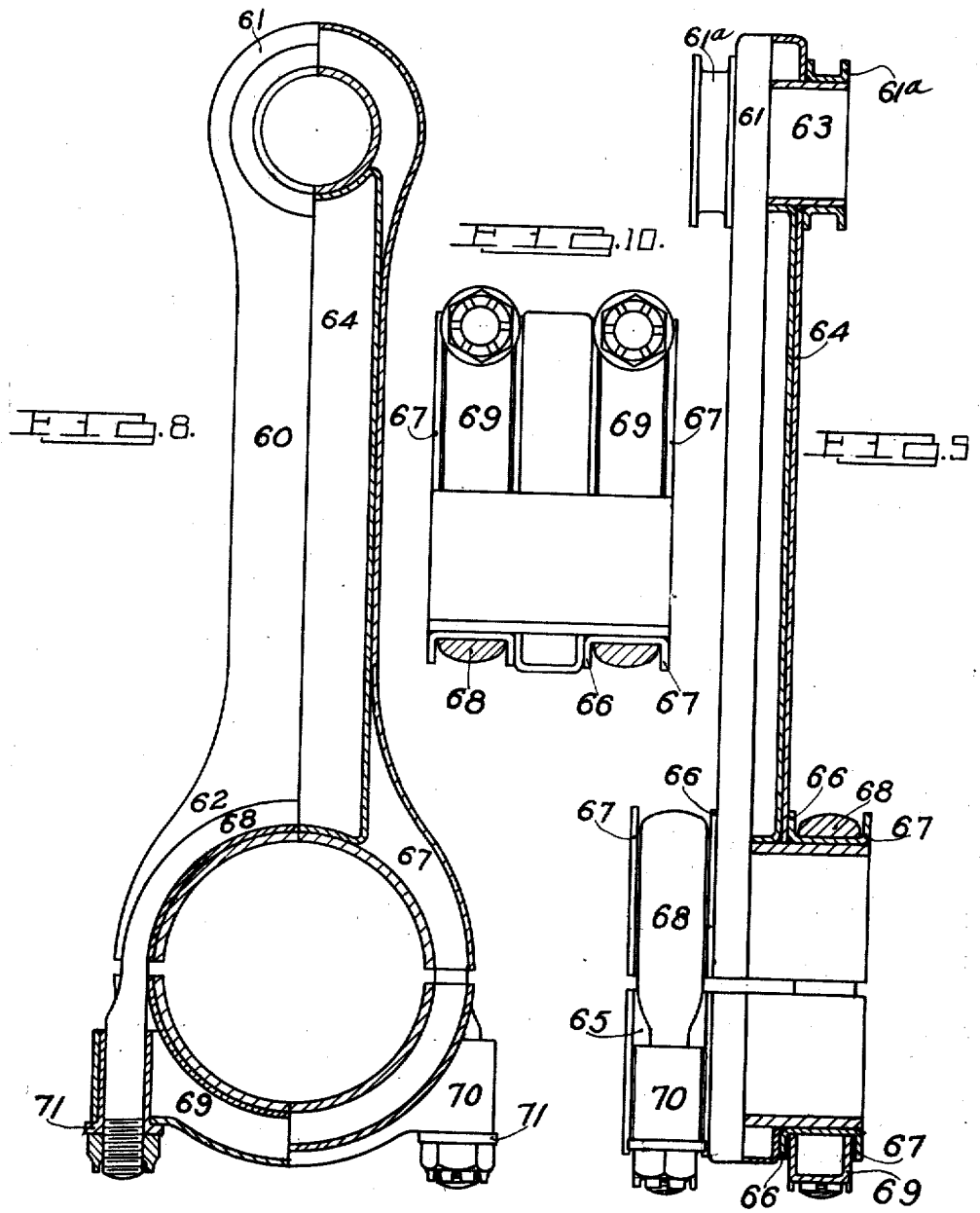

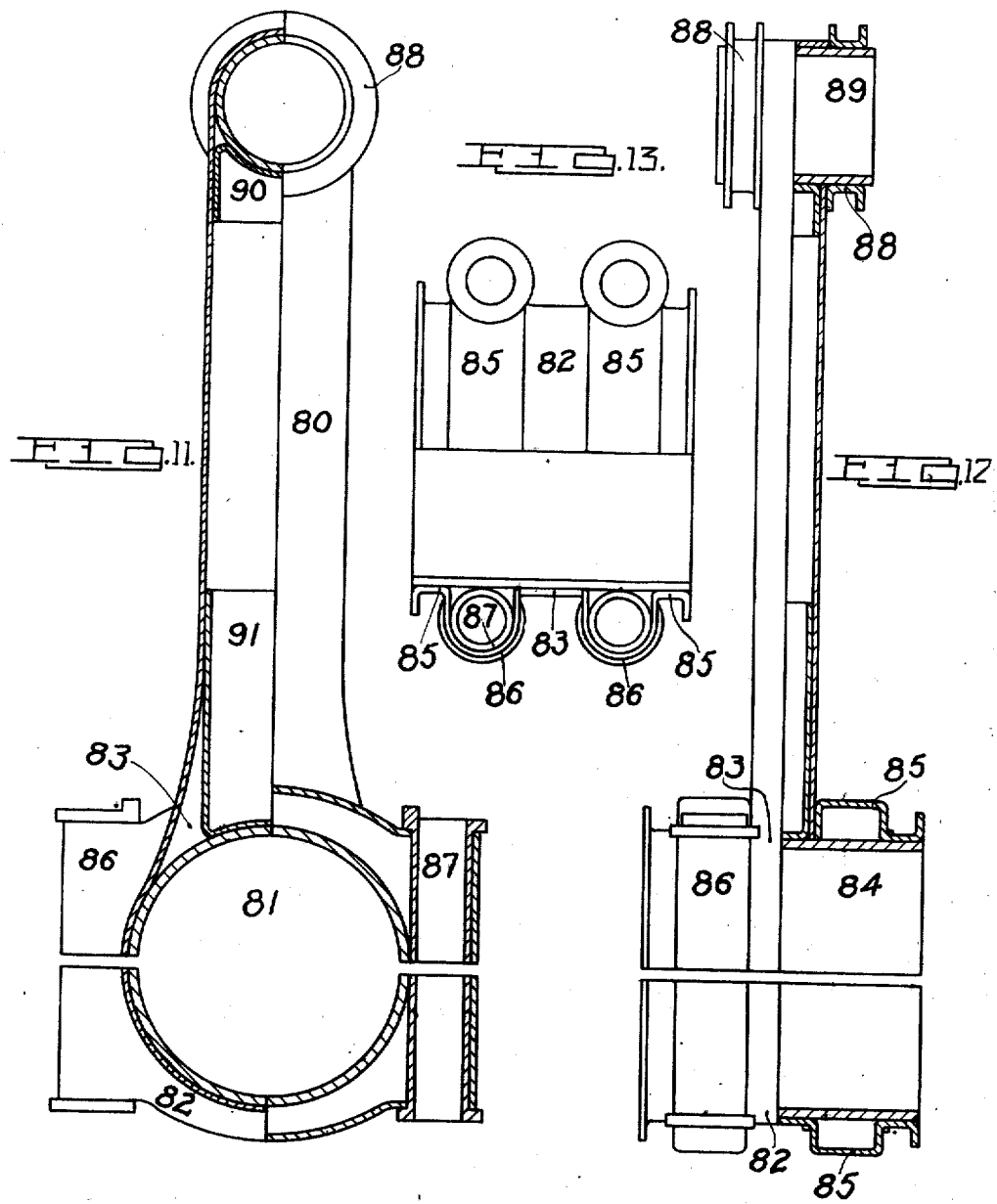

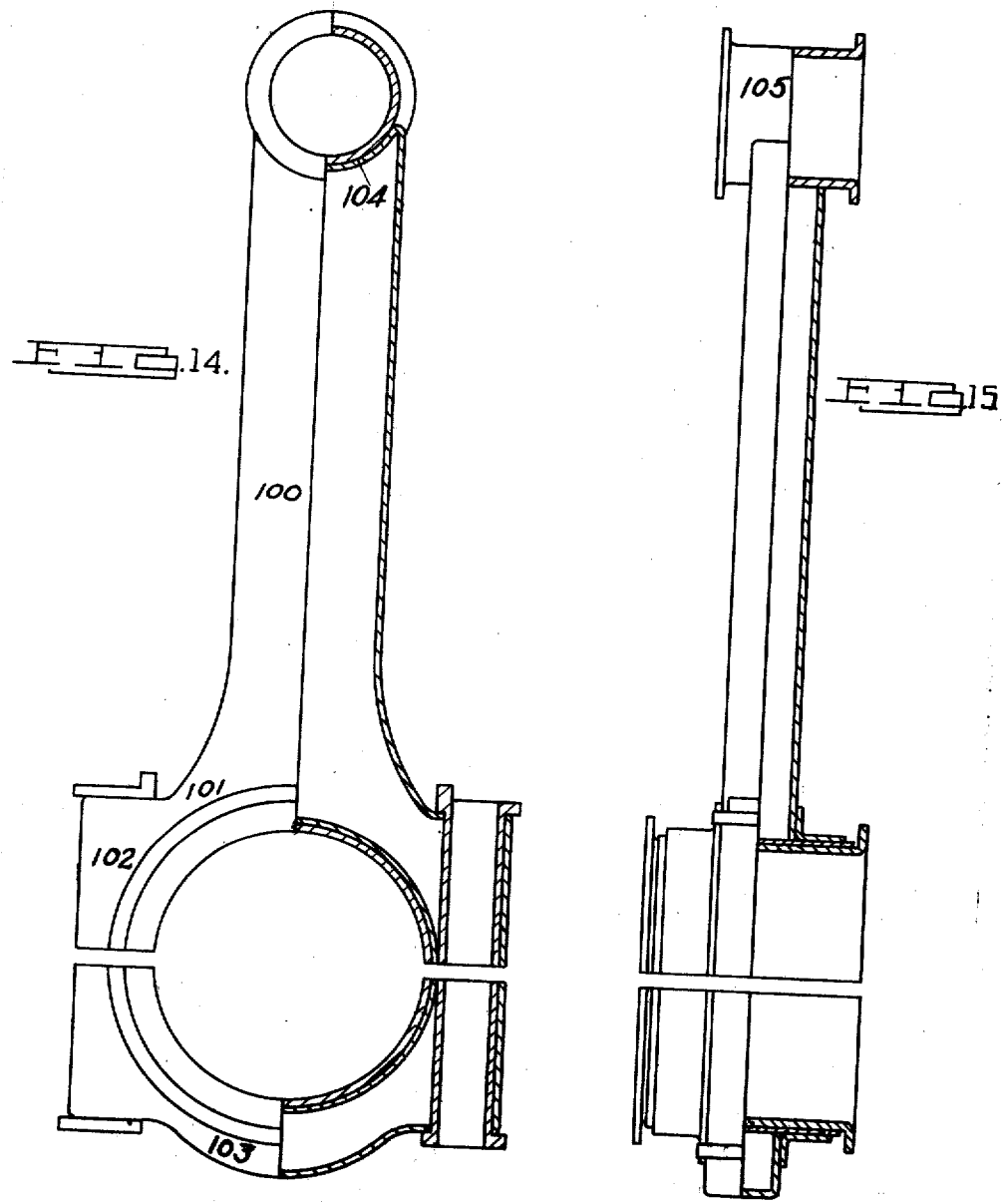

1,260,557.

Patented Mar. 26, 1918.
6 SHEETS—SHEET 6.

WITNESSES:
O. L. Thompson
C. E. Mulreany

INVENTOR.
Hebron B. Layman
BY W. W. Canfield.
ATTORNEY.

UNITED STATES PATENT OFFICE.

HEBRON BERNARD LAYMAN, OF NEW YORK, N. Y., ASSIGNOR TO THE LAYMAN PRESSED ROD COMPANY, INC., OF NEW YORK, N. Y., A CORPORATION OF NEW YORK.

CONNECTING-ROD.

1,260,557.  Specification of Letters Patent.  Patented Mar. 26, 1918.

Application filed April 17, 1916. Serial No. 91,566.

*To all whom it may concern:*

Be it known that I, HEBRON BERNARD LAYMAN, a citizen of the United States, and residing at New York, in the county of New York and State of New York, have invented certain new and useful Improvements in Connecting-Rods, of which the following is a specification, such as will enable those skilled in the art to which it appertains to make and use the same.

This invention relates to connecting rods, and particularly to rods made from sheet metal, and the object of the invention is to provide rods, which will be of great strength in proportion to weight, and which will also be simple in construction and efficient in use; and with this and other objects in view, as will hereafter appear in the specification and the claims, the invention consists in connecting rods, constructed as hereinafter described and claimed.

The invention is fully disclosed in the following specification, of which the accompanying drawings form a part, in which the separate parts of my improvement are designated by suitable reference characters in each of the views, and in which by way of example, I show in—

Figure 1 a part sectional and side view of my improved connecting rod;

Fig. 2 a view at a right angle to that of Fig. 1, and being also in partial section and showing parts broken away;

Fig. 3 a cross section on the line 3—3 of Fig. 1;

Fig. 4 a cross section on the line 4—4 of Fig. 1;

Fig. 5 a side elevation, one-half in section of a modified form of my improved connecting rod;

Fig. 6 a front elevation, one-half in section of the rod of Fig. 5;

One-half of Fig. 7 shows the bottom view of the cap of the rod in Fig. 5, the other half shows the abutting face of the rod at its junction with the cap;

Fig. 8 shows a side elevation of a modified form of rod, partly in section;

Fig. 9 a front elevation, one-half in section of the rod in Fig. 8;

One-half of Fig. 10 shows a bottom view of the cap, the other half shows the abutting face of the rod at its junction with the cap;

Fig. 11 shows a side elevation of another rod, partly in section;

Fig. 12 a front elevation, one-half in section of the rod in Fig. 11;

One-half of Fig. 13 shows a bottom view of the cap, the other half shows the abutting face of the rod at its junction with the cap.

Fig. 14 shows a side elevation, one-half in section of another rod, embodying modifications of the invention.

Fig. 15 is a front elevation, one-half in section of the rod in Fig. 14.

Figure 16:
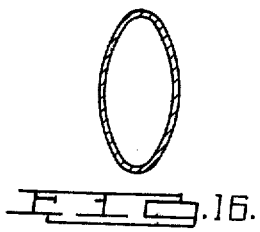

Figs. 16 to 25 inclusive show modifications of the form of the shank portions of the rods, which I may use within the scope of the appended claims.

By way of example, I show in Figs. 1 to 4 inclusive, that in the practice of my invention, I may provide a connecting rod shell composed of a one piece jointless edgeless sheet metal shank portion 1, a piston pin head portion 2 having a piston pin aperture 3; and a larger end or crank shaft head portion 4 having a transverse crank or crank shaft pin aperture 5, and provided with a detachable cap 6.

The shank portion 1, in the form of construction shown, involves or consists of a main outer tubular casing or shell 7 and is here provided with a reinforcement or reinforcing sleeve lining 8. The shell 7 is formed, or drawn, from a single piece of sheet metal, and one end portion thereof is fashioned to form the piston pin head portion 2 and the other end portion thereof is fashioned to form the crank shaft head portion 4.

For convenience I will hereafter and in the claims term certain portions of the rod " shell." By " shell " I mean the main portion of the rod, that is to say, the shank and one or both head or end portions, not including such parts as sleeves, bearings, bolt boss reinforcements, collars, shank reinforcements, and similar small parts of the rod.

The piston pin head aperture 3 is provided with a bearing sleeve bushing 10 which projects at both sides of the piston pin head portion and is provided at both ends with a reinforcement, consisting of outwardly directed flanges 11. The opposite end portions of the bearing sleeve bushing 10 are partially inclosed by reinforcing collars or bosses 12 formed integral with the head portion 2 of the shell 7, and said collars are provided with reinforcements consisting of outwardly directed flanges 13. As shown in Fig. 2 these collars or bosses 12 and 13 are wider than the shank portion of the shell.

The piston pin head portion 2 is also provided at one side thereof and at an angle to the axis of the shank 1 with a pinch bolt 14. It has a sleeve lining 15, which is interiorly threaded at its upper end, to receive a bolt 16 correspondingly threaded at 17, which serves as a key to hold the piston pin in position. The boss is sawed in two at 18 to allow it to be pinched around the piston pin.

The crank shaft end portion 4 of the rod has side walls rounded out at 20 to form bolt bosses. The reinforcing member 8 is passed into the interior of the shell before the liner bushing 28 is put in place. The L-shaped ends 21 of the part 8 have depending arc shaped portions 22 coöperating to form the bolt bosses. In the process of making connecting rod shells as described by me in my copending application, Serial No. 93,052, filed April 24, 1916, I form the shell 7 and cap 6 integral and afterward divide the end portion transversely to form the cap. I may, however, form the cap separately if desired.

The cap is spaced from the rod by shims 23 and secured thereto by bolts 24 to receive which, the bolt bosses of the rod shell are provided with threaded liners 25, the cap having corresponding plain sleeve liners 26.

In the apertures 5 of the crank end 4 is a bearing sleeve 28 having flanges 29 at its ends. It is partly inclosed and joined to the end of shell 7 by the bosses 30 which are integral with the shell. These bosses also have heat radiating flanges 31.

The shims 23 may be permanently united to either the end portion 4 or the cap 6 and the various small parts of the rod may be united in any desired manner as by brazing, fusing, or welding.

The flanges 12 and 30 provide a sufficient zone or area of contact between the liner bushings 10 and 28 and the shell and make a better construction. The flanges 11 and 13 at the piston end and 29 and 31 at the crank end, reinforce the bosses circumferentially and effectively radiate the heat generated in the bearings. The reinforcement 8 stiffens the shank and reinforces the junction of the shell and liner bushings 10 and 28. This reinforcing member taken in conjunction with the liner bushings forms a substantial load sustaining structure to which the shell 7 lends form and comeliness.

In Figs. 5, 6 and 7 is shown a connecting rod with a shell having a shank portion 40, provided with an integral piston pin head portion 41 and an integral crank head portion 42 and a cap 43, which is initially formed in one with the rod.

The piston pin head portion 41 is a substantially cylindrical hollow boss, provided with longitudinal side walls 44, each having a piston pin aperture. 45 are flanged drawn cuffs which are united to the walls 44, preferably by welding or brazing. These parts also coöperate to form the piston pin boss. Within the boss is fitted a liner bushing 46, and two flanged bushings 47, which abut at the center line of the rod. These bushings I prefer to spot weld and braze in place, but they may be fitted in any other desirable manner.

Within the hollow shank of the rod, there is a shank reinforcing member 48, which is of the same conformation as the shank, in this case oval, in cross section, and this member effectually unites the bushing in the piston end head portion to the shank. Sheet metal connecting rods, as heretofore constructed, have sometimes been weak in the region of the junction of the piston pin boss and the shank portion, especially when under tension. By the inclusion of this shank member 48, I materially increase the cross section of the rod at this region, and also increase the area of contact of the bushings in the boss.

The crank head end portion has two oppositely disposed hollow semicylindrical formations 49, which constitute bolt bosses to secure the cap in place. Within these bosses are fitted ferrules 50 having washers 51 at one end to receive nuts, and lipped washers 52, at the other end to restrain the bolt from turning.

53 are flanged cuffs which are united by their flanges to the rod. These coöperate to form a crank pin boss of the desired width. By applying these cuffs to form the bosses as distinguished from drawing the bosses from a single piece of material as shown at 30 in Fig. 2, I eliminate some of the sheet metal forming operations. 54 is a liner bushing within the crank end. 55 are flanged bushings which abut at the center line of the rod.

Within the shank there is a reinforcing member 56, which is a drawn steel cup having a bottom 57, which unites with the bushing 54 in the crank end. This reinforcement when welded or brazed, or otherwise secured to the shank, forms an adequate reinforcement of the rod against tension in the region of the junction of the shank and the crank pin boss, and against shear in the shank portion.

By the use of the shank reinforcing members 48 and 56, I am able to cut down the thickness of the metal from which the rod shell is formed.

58 is the flange of an oval aperture covered with a sheet metal cap 59. This aperture is used in the process of forming the rod as described in my copending application, Serial No. 93,052.

In Figs. 8, 9, and 10, 60 is the seamless shank portion, oval in cross section, of a connecting rod embodying modifications not previously referred to. The shell has an integral piston end 61, and an integral crank end 62. The side walls of the end portions of the shell form a double reinforcing rib around the pin apertures with which they are provided. 61ª are sheet metal thimbles, having a cylindrical body and two circumferential flanges each, by one of which flanges the pieces are united to the piston pin head end portion of the rod. The circumferential flanges form adequate reinforcing means to prevent the piston pin boss from spreading oval when in service. 63 is a bushing which coöperates to form a piston pin boss. 64 is a shank reinforcing member which extends from the piston pin boss to the crank pin boss, and effectually unites the two bosses to each other and to the shank portion of the rod.

At the crank pin end 65 are flanged thimbles, preferably formed from sheet metal united by the flanges 66 to the crank pin head portion of the rod. Between these flanges and the flanges 67, and around the rod portion of the crank head end of the rod are fitted U-shaped clamps 68.

The cap portion of the crank head end of the rod is provided with supplementary caps 69, each having two bosses 70 fitted with flanged ferrules 71 to admit the threaded ends of the U clamps. The supplementary caps are preferably united to the flanges 66 and 67, as shown in Fig. 9, but are not necessarily so affixed.

In Figs. 11, 12 and 13, 80 is the oval shank portion of a connecting rod shell, having a crank pin aperture 81, and employing a four-bolt construction to secure the cap 82 to the crank head end 83 of the rod. This crank pin aperture is provided with a bushing 84, which, in combination with the crank head end of the rod shell, forms the crank pin boss; also coöperating to make the crank pin boss are formed pieces of sheet metal 85 which constitute a series of radial reinforcing flanges, and are secured both to the crank end 83 of the rod shell and the lining bushing 84. At both sides of the rod these formed pieces are shaped to provide semi-cylindrical channels 86, which serve as bolt bosses, and are provided with liner bushings 87.

At the piston pin head end portion 88 are flanged thimbles which unite with the shell and the bushing 89 to form a piston pin boss. 90 is an interior reinforcing member which further unites the boss to the shank portion, and reinforces it to withstand tension. 91 is a similar shank reinforcing member which serves for the crank pin end.

In Figs. 14 and 15, 100 is the jointless edgeless tubular shank portion of a one piece sheet metal connecting rod shell, having crank head end 101 integral therewith, and provided with bolt bosses 102 for securing the cap 103 to the rod. The shank 100 has a closed end 104 in the region of the piston pin boss. This is depressed to conform to the shape of the member 105 which forms the piston pin boss. This member is united to the shank preferably by welding or brazing.

Fig. 16 shows the oval cross section of the shank of Figs. 5 to 15 inclusive.

Figure 17:
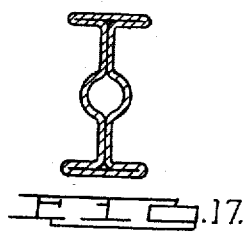

Fig. 17 shows a cross section of a modified I section shank which is of one piece and jointless and edgeless. It is to be observed that there is an opening in the center of the shank, which is intended to extend the length of the shank. This is designed to carry oil from the crank pin to the piston pin.

Figure 18:
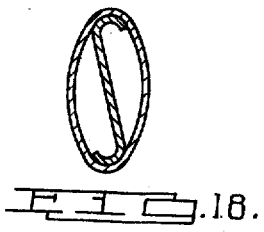

In Fig. 18 the oval shank of Fig. 16 is shown with an S shaped interior reinforcement.

Figure 19:
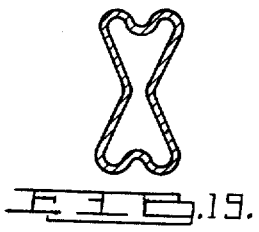
Figure 20:
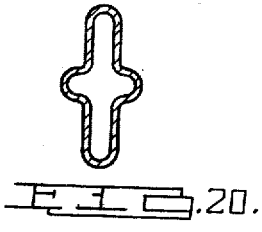

Figs. 19 and 20 show shanks of relatively great section modulus. In the process of making a rod shell with such shanks as these, the shank portion may be first drawn round or oval, and then in suitable closing dies the shank may then be shaped to the desired conformation.

Figure 21:
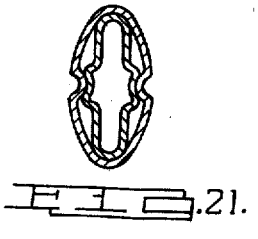

Fig. 21 shows a modification of an oval shank, having ribs formed in its side walls. The addition of such ribs gives the metal permanent set and aids in preventing the rod from "weaving". The interior reinforcement shown in this figure may be formed from a single piece of metal, or from a plurality of pieces.

Figure 22:
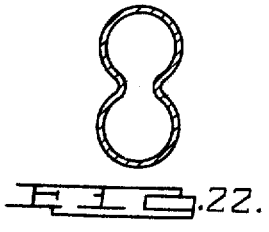

Fig. 22 shows a dumb-bell section of shank.

Figure 23:
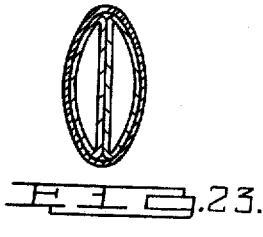

Fig. 23 shows an oval having a pair of interior members, which form a substantial reinforcement.

Where I use such reinforcements, the rod shell—that is to say the shank with one or both end portions—may be formed from very thin material: thus lessening the work required to produce the rod. Or, I may make the rod shell from an entirely different kind of material; for example: I might use aluminum or brass to form the shell yet make the shank reinforcements from steel, or some other material, which is more able to withstand compression and shear.

In this application the particular improvement just mentioned:—i. e.—connecting rod having a shell of non-ferrous or light material and a reinforcement of ferrous metal or the like is not claimed. This feature forms the subject matter of a co-pending application, Serial No. 159,398, filed April 3, 1917.

Figure 24:
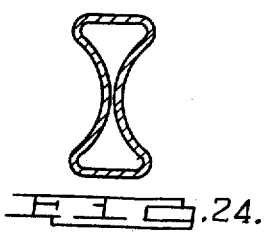

Fig. 24 is another modification of an I section shank which is hollow.

Figure 25:
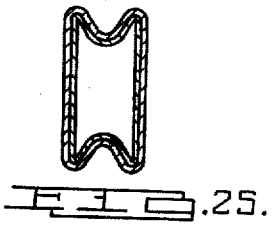

Fig. 25 is a modified H section of shank, having a reinforcing member of the same conformation.

A connecting rod of the construction herein described and claimed will be of extreme lightness and of great rigidity, and also possess that modicum of resiliency so greatly sought for in connecting rods used in high speed engines. Rods of this type also possess many other features which need not be here enumerated, but which will be readily apparent to those skilled in the art.

It will be understood that while I have shown and described certain preferred embodiments of my invention, it is not limited to the precise details of construction shown and described. The construction may be modified in various ways without departing from my invention, as set forth in the appended claims.

In this application I am claiming broadly certain features illustrated and described, but not claimed in my co-pending application Serial No. 86,361 filed March 24th, 1916.

By the term "sheet metal" as used herein in the specification and claims, it is to be understood that this phrase is used as a term of description and not of limitation.

By "sheet metal" I mean having the characteristics of sheet metal as distinguished from having the characteristics of casting or forgings.

The inherent characteristics of sheet metal are well known to those skilled in the art.

Having fully described my invention, what I claim as new and desire to secure by Letters Patent, is:—

1. A connecting rod, link, lever or the like, comprising a shank portion, a head portion having an aperture and a second head portion having an aperture, the shank portion, the said head portion and one-half of the said second head portion being made from a single piece of relatively thin material and the shank portion being reinforced.

2. A connecting rod, link, lever or the like, comprising a tubular shank portion, a head portion having an aperture and a second head portion having an aperture, the tubular shank portion, the said head portion and one-half of the said second head portion being made from a single piece of relatively thin material, and the tubular shank portion being reinforced interiorly.

3. A connecting rod, link, lever or the like, comprising a tubular shank portion, a head portion and a second head portion, one-half of which is formed in connection with the shank portion, the said head portion and the said second head portion being provided with apertures and all of said parts being fashioned from a single piece of relatively thin material reinforced by a tubular sleeve within the shank portion and forming part of the said second head portion that is formed in connection with the shank.

4. A connecting rod, link, lever, lever or the link, comprising a jointless, edgeless shank portion, a head portion and a second head portion, one-half of which is formed in connection with the shank portion, the said head portion and the said second head portion being provided with apertures, and all of said parts being fashioned from a single piece of relatively thin material, reinforced by a member united to the said shank portion and to the said second head portion.

5. A connecting rod, link, lever or the like, comprising a shank portion, a head portion having an aperture and a second head portion having an aperture, the shank and one of said head portions being made from a single piece of relatively thin material and reinforcements for the said portions to strengthen the same.

6. A connecting rod, link, lever or the like having a tubular shank made from a single piece of relatively thin material, and reinforced by a member secured therein.

7. A connecting rod, link, lever or the like formed from a single piece of relatively thin material, and provided with a bearing, said rod, link, lever or the like being adapted to be separated through said bearing to form a cap.

8. A connecting rod, comprising a sheet metal shank portion, longitudinally jointless and edgeless, and two head portions, the said shank portion and a part of one head portion being integral.

9. A connecting rod, comprising a sheet metal shank portion, longitudinally jointless and edgeless, and two head portions, one of said head portions and a part of the other head portion being integral.

10. A connecting rod, comprising a sheet metal longitudinally jointless shank portion, and two head portions, the shank portion and a part of each of the head portions being integral.

11. A connecting rod, comprising a tubular shank portion, and two head portions, the said tubular shank portion and a part of the two head portions being integral, and the tubular shank portion being reinforced internally.

12. A connecting rod, comprising a sheet metal hollow shank portion, longitudinally jointless and edgeless, and two head portions, a part of one of the said head portions being integral with the shank portion, and a reinforcement within the hollow shank portion.

13. A connecting rod having a hollow shank portion, and a reinforcement within said hollow shank portion.

14. A sheet metal connecting rod, having a longitudinally jointless tubular shank.

15. A sheet metal connecting rod, having a shank, longitudinally jointless and edgeless.

16. A connecting rod, having a sheet metal longitudinally jointless shank portion, and having integral therewith a head portion adapted to receive a pin.

17. A connecting rod, having a sheet metal one-piece jointless shell.

18. A connecting rod having a one piece jointless sheet metal shell and having sleeve like members carried by the ends of the shell.

19. A connecting rod having a one piece jointless sheet metal shell and having sleeve like members carried by the ends of the shell, and bearings in the said sleeve like members to coöperate with crank and piston pins.

20. A connecting rod having a one piece jointless shell fashioned from a single piece of thin metal and having larger and smaller end portions, sleeve like members in said larger and smaller end portions, to reinforce the same and the larger end portions of the shell having provisions to receive bolts to secure a cap to the rod shell.

21. A connecting rod, having a hollow longitudinally jointless sheet metal shank portion reinforced internally.

22. A connecting rod, having a longitudinally jointless edgeless shank portion, and an auxiliary shank reinforcement therefor.

23. A connecting rod having a shell, and comprising a sheet metal, longitudinally jointless shank portion and integral end portions, said end portions being apertured and having sleeve members in the said apertures to reinforce the ends of the rod, and collar like members on said sleeves and adjacent the end portions to further reinforce the said ends.

24. A connecting rod having a one piece longitudinally jointless shell, said shell comprising a shank portion and integral larger and smaller end portions, the larger end portions having apertures therein to receive tubular bolt receivers, and tubular bolt receivers therein.

25. A connecting rod having a one piece jointless sheet metal shell, said shell comprising an edgeless shank portion and integral larger and smaller end portions, the larger end portion being adapted to be divided transversely to form a cap, bolt apertures in the larger end portion, and tubular bolt receivers therein.

26. A connecting rod having a one piece jointless sheet metal shell, said shell comprising an edgeless shank portion and integral larger and smaller end portions.

27. A connecting rod having a metal shell and comprising a jointless shank portion, and integral end portions, said end portions being apertured to receive crank and piston pins.

28. A connecting rod having a one-piece jointless sheet metal shell, and having shank and end portions, the said shank being reinforced.

29. A connecting rod having a one piece longitudinally jointless sheet metal shell and having shank and end portions, one of said end portions being adapted to be divided transversely to form a second part.

30. A connecting rod having a one piece longitudinally jointless sheet metal shell and having a shank portion and end portions, one of said end portions having provisions for receiving bolts, and said end being adapted to be divided transversely to form a second part.

31. A connecting rod having a one piece longitudinally jointless sheet metal shell, and having a shank portion and end portions, one of said end portions being apertured to receive bolt receivers, tubular bolt receivers in the said apertures and said end being adapted to be divided transversely to form a second part.

32. A connecting rod having a one piece longitudinally jointless sheet metal shell and having a shank portion and end portions, one of said end portions having a sleeve like member therein to strengthen the same, said end portion being adapted to be divided transversely to form a second part.

33. A connecting rod having a one piece longitudinally jointless sheet metal shell and having a shank portion and end portions, one of said end portions having a sleeve like member therein to strengthen the same, said end portions having provisions for receiving bolts and being adapted to be divided transversely to form a second part.

34. A connecting rod having a one piece longitudinally jointless sheet metal shell and having shank and end portions, one of said end portions having a sleeve like member therein to strengthen the same, said end portions being adapted to receive tubular bolt receivers, tubular bolt receivers therein, and said end portion being adapted to be divided transversely to form a second part.

35. A connecting rod having a one piece longitudinally jointless sheet metal shell and having a shank and end portions, one of said end portions having a sleeve-like member associated therewith for strengthening the same.

36. A connecting rod having a one piece longitudinally jointless sheet metal shell and having a shank and end portions, one of said end portions having a sleeve member associated therewith for strengthening the same, and a bearing within the sleeve like member.

37. A connecting rod having a one piece longitudinally jointless sheet metal shell and having a shank portion and end portions, one of said end portions having a sleeve like member to strengthen the same, and collar-like members associated with the said sleeve and the end portion to further reinforce the end of the rod.

38. A connecting rod having a one piece longitudinally jointless sheet metal shell and having a shank and end portions, one of said end portions having a sleeve-like member associated therewith for strengthening the same, collar-like members associated with the said sleeve and the end of the rod to further reinforce the same, and a bearing within the said sleeve.

39. A connecting rod having a one piece longitudinally jointless sheet metal shell and having a shank and end portions, one of said end portions having provisions for receiving bolts to secure a cap to the rod.

40. A connecting rod having a one piece longitudinally jointless sheet metal shell and having a shank portion and end portions, one of said end portions having the thin metal shaped to form bolt bosses.

41. A connecting rod having a one piece longitudinally jointless sheet metal shell and having a shank portion and an end portion, said end portion having the thin metal shaped to form bolt bosses, and tubular bolt receivers in the said bolt bosses.

42. A connecting rod having a one piece longitudinally jointless sheet metal shell and having a shank portion and an end portion, said end portion having a sleeve like member therein to strengthen the same and having the thin metal of the end shaped to form bolt bosses.

43. A connecting rod having a one piece longitudinally jointless sheet metal shell and having a shank portion and an end portion, said end portion having collar like members to strengthen the same, and bolt bosses shaped from the thin metal of the said ends.

44. A connecting rod having a one piece sheet metal shell, adapted to have a cap cut therefrom.

45. A connecting rod, having a sheet metal shell, and provided with a one piece sheet metal shank terminating in an integral head portion, the said portion having two oppositely disposed pin bosses extending therefrom.

46. A connecting rod, having a one-piece sheet metal shell, and comprising end portions provided with crank and piston pin bosses, the said shell being jointless in the plane of the axes of the crank and piston pin bosses.

47. A connecting rod, having a one-piece sheet metal shell, and comprising end portions apertured and reinforced to receive crank and piston pins.

48. A connecting rod, provided with a sheet metal shell, and comprising a shank and two end portions, one of said end portions being apertured in the side walls thereof to receive a piston pin, and the other end portion being adapted to be divided transversely to form a cap.

49. A connecting rod having a one-piece sheet metal shell, and provided with a shank comprising a plurality of parallel longitudinal walls.

50. A connecting rod having a head end formed from a single piece of sheet metal provided with a recess adapted to receive a tubular bolt receiver.

51. A connecting rod having a one-piece sheet metal shell, and comprising end portions, provided with crank and piston pin bosses, the said shell being jointless in any plane at an angle to the plane of the axes of the crank and piston pin bosses.

52. A connecting rod having a shell with apertured ends and a hollow shank, a lining within the aperture in each end, a reinforcing member within the hollow shank uniting the said linings.

53. A connecting rod having a shell with apertured ends and a hollow shank, a lining within the aperture in each end, a tubular reinforcing member within the hollow shank uniting the said linings.

54. A connecting rod having a shell with an apertured end and a hollow shank, a lining within the aperture, and a member within the shank to unite the lining thereto and reinforce the junction therewith In testimony that I claim the foregoing as my invention I have signed my name in presence of the subscribing witnesses this 14th day of April, 1916.

HEBRON BERNARD LAYMAN.

Witnesses:
H. E. THOMPSON,
C. E. MULREANY.